United States Patent
Hwang et al.

(10) Patent No.: US 10,783,351 B2
(45) Date of Patent: Sep. 22, 2020

(54) SYSTEM AND METHOD FOR SENSING FACIAL GESTURE

(75) Inventors: Young Kyoo Hwang, Seoul (KR); Jung Bae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 12/458,211

(22) Filed: Jul. 2, 2009

(65) Prior Publication Data

US 2010/0109998 A1 May 6, 2010

(30) Foreign Application Priority Data

Nov. 4, 2008 (KR) .................. 10-2008-0108747

(51) Int. Cl.
*G06T 13/40* (2011.01)
*G06K 9/00* (2006.01)

(52) U.S. Cl.
CPC ..... *G06K 9/00221* (2013.01); *G06K 9/00315* (2013.01); *G06T 13/40* (2013.01)

(58) Field of Classification Search
CPC .......... G06F 17/30032; G06K 9/00315; G06K 9/00221; G06T 13/40
USPC .......................... 345/158, 175, 207; 382/195
See application file for complete search history.

(56) References Cited

U.S. PATENT DOCUMENTS

| | | | | |
|---|---|---|---|---|
| 6,272,231 B1 * | 8/2001 | Maurer | | G06K 9/00228 382/103 |
| 2002/0012454 A1 * | 1/2002 | Liu | | G06K 9/00201 382/118 |
| 2002/0136433 A1 * | 9/2002 | Lin | | G06K 9/00295 382/118 |
| 2004/0201586 A1 * | 10/2004 | Marschner et al. | | 345/426 |
| 2006/0055706 A1 * | 3/2006 | Perlman et al. | | 345/589 |
| 2007/0091085 A1 * | 4/2007 | Wang et al. | | 345/420 |
| 2007/0229498 A1 * | 10/2007 | Matusik et al. | | 345/420 |
| 2007/0236501 A1 * | 10/2007 | Kim et al. | | 345/473 |
| 2008/0136814 A1 * | 6/2008 | Chu et al. | | 345/419 |
| 2010/0007665 A1 * | 1/2010 | Smith et al. | | 345/473 |
| 2010/0141662 A1 * | 6/2010 | Storey et al. | | 345/473 |
| 2011/0227923 A1 * | 9/2011 | Mariani et al. | | 345/427 |

FOREIGN PATENT DOCUMENTS

| | | |
|---|---|---|
| CN | 1866271 A | 11/2006 |
| CN | 1949246 A | 4/2007 |
| KR | 10-2004-0007000 | 1/2004 |

(Continued)

OTHER PUBLICATIONS

Korean Office Action dated Oct. 17, 2014, in counterpart Korea Application No. 10-2008-0108747 (5 pages, in English; 6 pages, in Korean).

(Continued)

*Primary Examiner* — Jeff Piziali
(74) *Attorney, Agent, or Firm* — NSIP Law (57) ABSTRACT

A method and system of sensing facial gestures are disclosed. The method of sensing facial gestures includes determining a basic database (DB) for sensing facial gestures of a user, estimating a head pose of the user, extracting a mesh model corresponding to the estimated head pose using at least one of a personalized DB and a general DB, and sensing the facial gestures using the extracted mesh model, and reflecting the sensed facial gestures to a virtual object.

1 Claim, 6 Drawing Sheets

(56) References Cited

FOREIGN PATENT DOCUMENTS

| KR | 10-2005-0042369 | | 5/2005 | |
| KR | 10-2006-0133563 A | | 12/2006 | |
| KR | 10-2008-0065866 | | 7/2008 | |
| WO | WO 2005073896 A1 | * | 8/2005 | ............... G06K 9/00 |

OTHER PUBLICATIONS

Chinese Office Action dated Nov. 19, 2012 in corresponding Chinese Patent Application 200910166603.8.
European Search Report dated Dec. 20, 2013 in corresponding European Application No. 09 168 564.4.
Neumann, et al:, "Constructing A Realistic Head Animation Mesh for a Specific Person," Dec. 31, 1999, pp. 1-8, *Integrated Media Systems Center, Computer Science Department, USC; Eyematic Interfaces, Inc.*
Chang, et al., "Automatic 3D Facial Expression Analysis in Videos," Jan. 1, 2005, pp. 1-15, *Analysis and Modelling of Faces and Gestures Lecture Notes in Computer Science, LNCS, Springer; Computer Science Department, UCA*, Santa Barbra.
Blanz, et al., "A Morphable Model for the Synthesis of 3D Faces," Aug. 8, 1999, pp. 187-194, *Computer Graphics Proceedings. SIGGRAPH 99*, New York, NY, USA.
Chin, et al., "A PDA Based Personalized 3D Facial Expression System," Aug. 16, 2006, pp. 468-475, *ICIC 2006, LNAI 4114*.
Abate, et al., "3D Face Recognition in a Ambient Intelligence Environment Scenario," Jul. 1, 2007, pp. 1-14, *Dip. Di Matematica e Informatica—Universitádegli Studi di Salerno*, Italy.
Zalewski, et al., "2D Statistical Models of Facial Expressions for Realistic 3D Avatar Animation," Jun. 20, 2005, pp. 217-222, *Computer Society Conference on Computer Vision and Pattern Recognition, 2005, IEEE*.
Mpiperis, et al., "Bilinear Models for 3-D Face and Facial Expression Recognition," Aug. 12, 2008, pp. 498-511, *IEEE Transactions on Information Forensics and Security*, vol. 3, No. 3, Sep. 2008.
Valente, et al., "Face Tracking and Realistic Animations for Telecommunicant Clones," Jul. 1999, pp. 678-683, *IEEE International Conference on Multimedia Computing Systems (ICMCS 99)*, Jun. 7-11, 1999, Florence, Italy.

* cited by examiner

SYSTEM AND METHOD FOR SENSING FACIAL GESTURE

CROSS-REFERENCE TO RELATED APPLICATIONS

This application claims the benefit of Korean Patent Application No. 10-2008-0108747, filed on Nov. 4, 2008, in the Korean Intellectual Property Office, the disclosure of which is incorporated herein by reference.

BACKGROUND

1. Field

One or more example embodiments of the present disclosure relate to a method and system of sensing facial gestures, and more particularly, to a technique in which poses of input images may be determined and a personalized database (DB) for each pose may be used, thereby sensing facial gestures according to characteristics of each user.

2. Description of the Related Art

In processing facial images of a user, the user may desire to easily animate the user's own face or clone the same to another agent only using an image device and without the need for any separate devices.

The above-described easy animation of the user's face may be an important and difficult technique in computer graphics. For this technique, a laser scanner or a separate device may be mounted and used. However, these devices may be unsuitable as an interface to personal entertainment equipment due to their high cost and large size.

Accordingly, a technique of modeling the face of the user based on images and estimating changes in the modeling has been suggested. A method of finding feature points, determining poses, and fitting a face mesh model to thereby estimate changes in facial gestures has been used. However, estimating changes in the facial gestures according to characteristics of the user may be difficult.

Thus, there is a need for a technique of more precisely estimating facial gestures according to poses of the user, and sensing accurate poses coinciding with characteristics of each user.

SUMMARY

According to example embodiments, a method of sensing facial gestures may be provided. The method may include determining a basic database (DB) for sensing facial gestures of a user, estimating a head pose of the user, extracting a mesh model corresponding to the estimated head pose using at least one of a personalized DB and a general DB, and sensing the facial gestures using the extracted mesh model, and reflecting the sensed facial gestures to a virtual object.

In this instance, the determining of the basic DB may include recognizing a face of the user, determining whether the user is registered, and determining the basic DB depending on whether the user is registered.

Also, the determining of the basic DB may determine, as the basic DB, a personalized DB of the user stored in advance when the user is registered.

Also, the determining of the basic DB may include selecting, by the user, whether the personalized DB is constructed when the user is an unregistered user and determining, as the basic DB, the personalized DB constructed according to the selection of the user or a predetermined general DB.

Also, the estimating may include extracting a face region of the user, extracting a face descriptor with respect to the face region of the user, and performing projection operation on the extracted face descriptor with a plurality of pose classifiers stored in advance.

Also, the sensing of the facial gestures may include determining a mesh model corresponding to the estimated head pose using at least one of the personalized DB and the general DB, fitting the determined mesh model onto a face of the user, and performing mesh tracking with respect to the fitted mesh model.

Also, the reflecting may include measuring a degree of change in each of feature points of the face of the user, and reflecting the degree of change to movement of each of feature points of a face of the virtual object.

According to example embodiments, there may be also provided a system of sensing facial gestures, the system including: an initialization performing unit to determine a basic DB for sensing facial gestures of a user; a pose estimating unit to estimate a head pose of the user; a facial gesture sensing unit to extract a mesh model corresponding to the estimated head pose using at least one of a personalized DB and a general DB, and sensing the facial gestures using the extracted mesh model; and a virtual object reflecting unit to reflect the sensed facial gestures to the virtual object.

In this instance, the initialization performing unit may include a face recognizing unit to recognize a face of the user, a personalized DB constructing unit to construct the personalized DB depending on whether the user is registered, and depending on a selection of the user, and a DB to store the personalized DB and the general DB.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
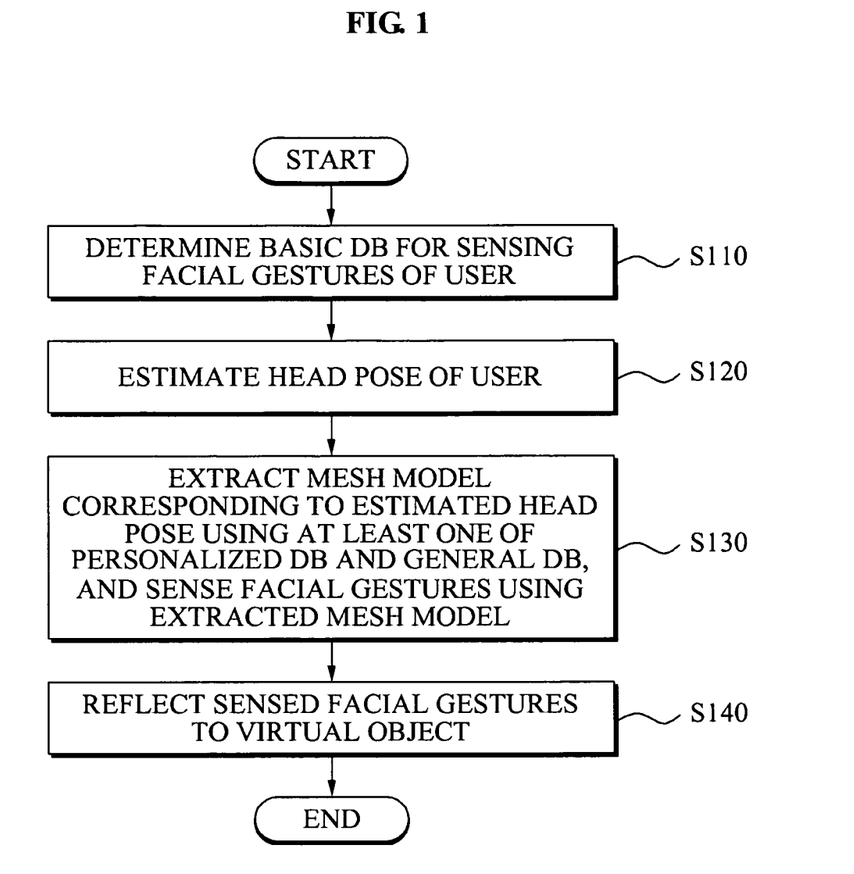
FIG. 1 is a diagram illustrating a method of sensing facial gestures according to example embodiments.

FIG. 1 is a diagram illustrating a method of sensing facial gestures according to example embodiments.

Referring to FIG. 1, in operation S110, the method according to the present embodiment may determine a basic database (DB) for sensing facial gestures of a user. In this instance, the method may determine whether the user is registered, and use a predetermined personalized DB as the basic DB when the user is registered. Otherwise, the method may allow the user to select whether the personalized DB is constructed when the user is an unregistered user. Specifically, when the user is not registered, the user may select to construct the personalized DB, and a constructed personalized DB coinciding with characteristics of the user may be used as the basic DB. When the user chooses not to select to construct the personalized DB, a general DB may be used instead as the basic DB. The basic DB may be used in extracting facial gestures using a mesh model for each pose. Also, the basic DB may be used to more accurately reflect the facial gestures of the user to a virtual object (e.g., an Avatar, etc.) A detailed configuration of operation S110 according to an embodiment will be described in greater detail with reference to FIG. 2.

In operation S120, the method may estimate a head pose of the user. For estimating the head pose, the method may extract a face region of the user, extract a face descriptor from the face region, and perform a projection operation on the extracted face descriptor with a pose classifier stored in advance to thereby estimate the head pose. An example embodiment of a detailed configuration of operation S120 will be described in detail with reference to FIG. 3.

In operation S130, the method may extract a mesh model corresponding to the estimated head pose using at least one of the personalized DB and the general DB, and sense facial gestures using the extracted mesh model. Specifically, the method may determine the mesh model corresponding to the estimated head pose using the at least one of the personalized DB and general DB, and perform mesh fitting and mesh tracking to thereby sense the facial gestures. A detailed configuration of operation S130 according to an embodiment will be described in detail with reference to FIG. 4.

In operation S140, the method may reflect the sensed facial gestures to a virtual object. Specifically, the method may analyze a pattern of changes in feature points after performing the mesh tracking, and accurately reflect the facial gestures of the user to the virtual object using the at least one of the personalized DB and general DB. A detailed configuration of operation S140 according to an embodiment will be described in detail with reference to FIG. 5.

As described above, the method may segment and estimate the head pose of the user, accurately extract the facial gestures according to characteristics of each user using the personalized DB of the user, and more precisely reflect the extracted facial gestures to the virtual object.

Figure 2:
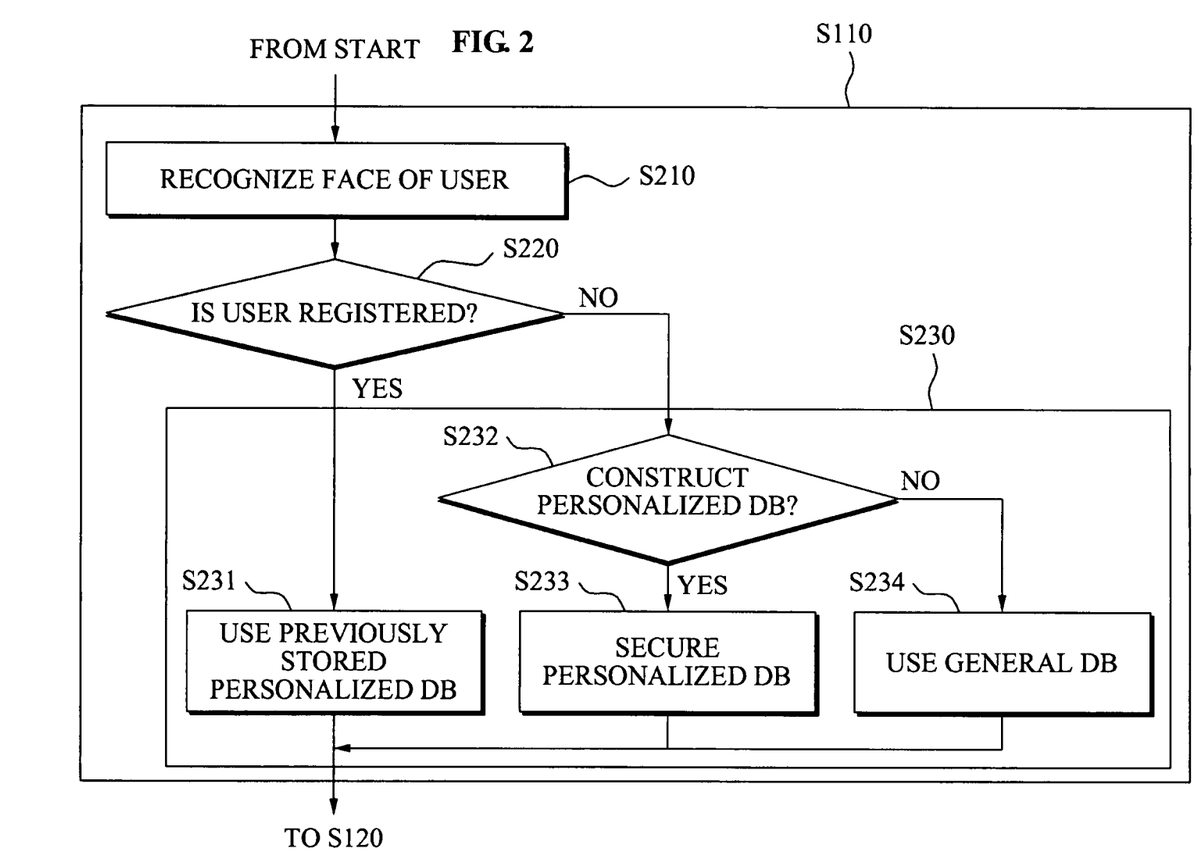
FIG. 2 is a diagram illustrating a detailed configuration of an operation for determining a basic database (DB) in the method of sensing facial gestures of FIG. 1.

FIG. 2 is a diagram illustrating a detailed configuration of an operation for determining a basic DB in the method of sensing facial gestures of FIG. 1.

Referring to FIG. 2, in operation S210, the method may recognize a face from input images. Specifically, images of the user may be input from an image device, and the face may be recognized from the input images of the user.

In operation S220, the method may determine whether the user is registered. Specifically, since the personalized DB coinciding with characteristics of the user may be stored in advance for a registered user, the personalized DB stored in advance may be used, eliminating the need for repeatedly re-constructing the personalized DB.

In operation S230, the method may determine the basic DB depending on whether the user is registered.

In operation S231, the user may utilize data coinciding with the characteristics of the user using the personalized DB when the user is registered. Specifically, the personalized DB may store data for each of the determined poses, and recognize an action unit code corresponding to each of the determined poses to thereby sense the facial gestures. Accordingly, when the user is a registered user, the personalized DB may be determined as the basic DB.

In operation S232, when the user is an unregistered user, the method may allow the user to select whether to construct the personalized DB. The personalized DB may be encrypted or secured, such as with password protection, in order to protect the characteristics of the user. In operations S233 and S234, the personalized DB, constructed by the selection of the user, or the predetermined general DB may be determined as the basic DB. Here, a plurality of images for each pose may be input from the user when constructing the personalized DB. Specifically, the plurality of images for at least one pose may be input to construct the personalized DB. Here, images from various viewpoints may be acquired from a camera, and the head pose of the user may vary diversely according to instructions while the user maintains an expressionless face. For example, the head may look directly at a center of the camera, and the head may take various poses ranging from the rightmost side to the leftmost side and from the upper side and to the lower side.

Also, at least one of user identification (ID) information and a mesh model parameter for mesh fitting may be stored from the user when the user selects to construct the personalized DB, and the personalized DB may be constructed. Also, the general DB may be used when the user does not select to construct the personalized DB.

As described above, the personalized DB may be constructed and used according to the characteristics of each user, whereby more precise facial gestures of the user coinciding with the characteristics of the user may be recognized.

Figure 3:
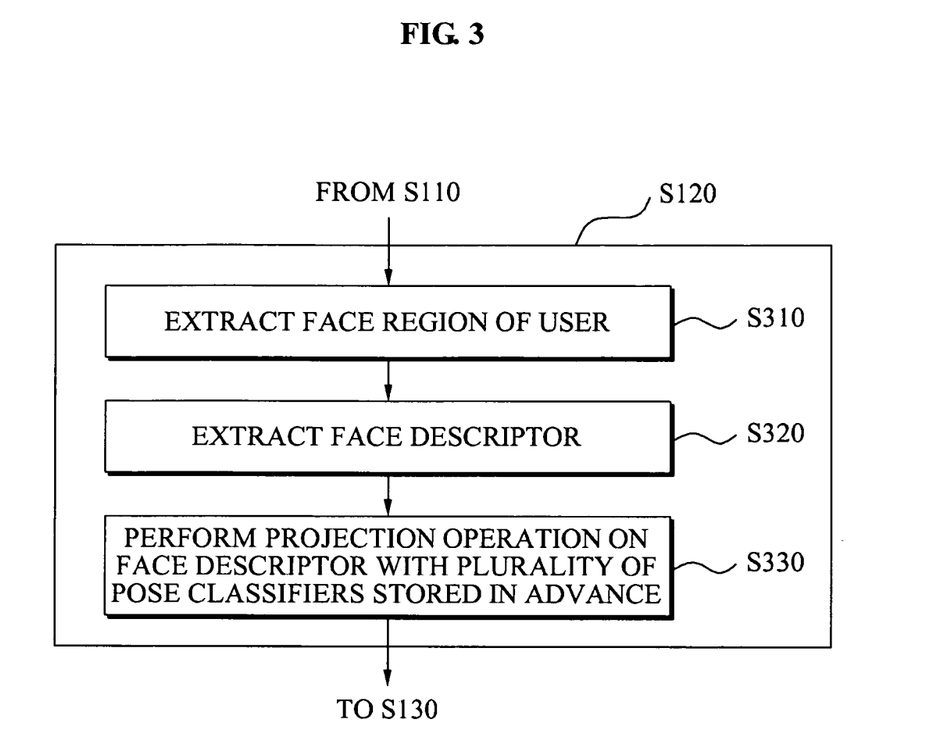
FIG. 3 is a diagram illustrating an operation for estimating a head pose of a user in the method of sensing facial gestures of FIG. 1 in detail.

FIG. 3 is a diagram illustrating a detailed configuration of an operation for estimating a head pose of a user in the method of sensing facial gestures of FIG. 1.

Referring to FIG. 3, in operation S310, the method may extract a face region of the user.

In operation S320, the method may extract a face descriptor from the face region so as to estimate the pose. For extracting the face descriptor, regions and filters used for effective extraction of the face descriptor may be defined, and the face descriptor may be extracted using previously selected locations and filters. Here, the face descriptor may include a vector including information about characteristics of the face region.

In operation S330, the method may perform a projection operation on the face descriptor with at least one previously generated pose classifier, thereby estimating an approximate pose. In this instance, the pose classifier may generate a classifier enabling estimation of an approximate head pose using learning theories from a previously stored DB. Here, three head pose classifiers may be needed in order to estimate three head poses.

For example, when the three head pose classifiers are denoted as $C_1$ (left profile, $C_2$ (frontal view), and $C_3$ (right profile) and the extracted face descriptor is denoted as $D_f$, a projection operation may be performed on the extracted face descriptor with each of the pose classifiers. This may be represented as $<C_1, D_f>$, $<C_2, D_f>$, and $<C_3, D_f>$. Here, when a largest value of three values obtained by performing the projection operation is $<C_1, D_f>$, a corresponding pose classifier, that is, $C_1$, is used for a left profile, whereby a corresponding head pose may be estimated as the left profile. Similarly, when the largest value thereof is $<C_2, D_f>$, $C_2$ is used for a frontal view, whereby a corresponding head pose may be estimated as the frontal view, and when the largest value thereof is $<C_3, D_f>$, $C_3$ is used for a right profile, whereby a corresponding head pose may be estimated as the right profile.

Accordingly, the head pose may be estimated through the projection operation on the face descriptor with the pose classifier, and when wishing to obtain more segmented head poses, the projection operation on the face descriptor with more pose classifiers may be performed.

Figure 4:
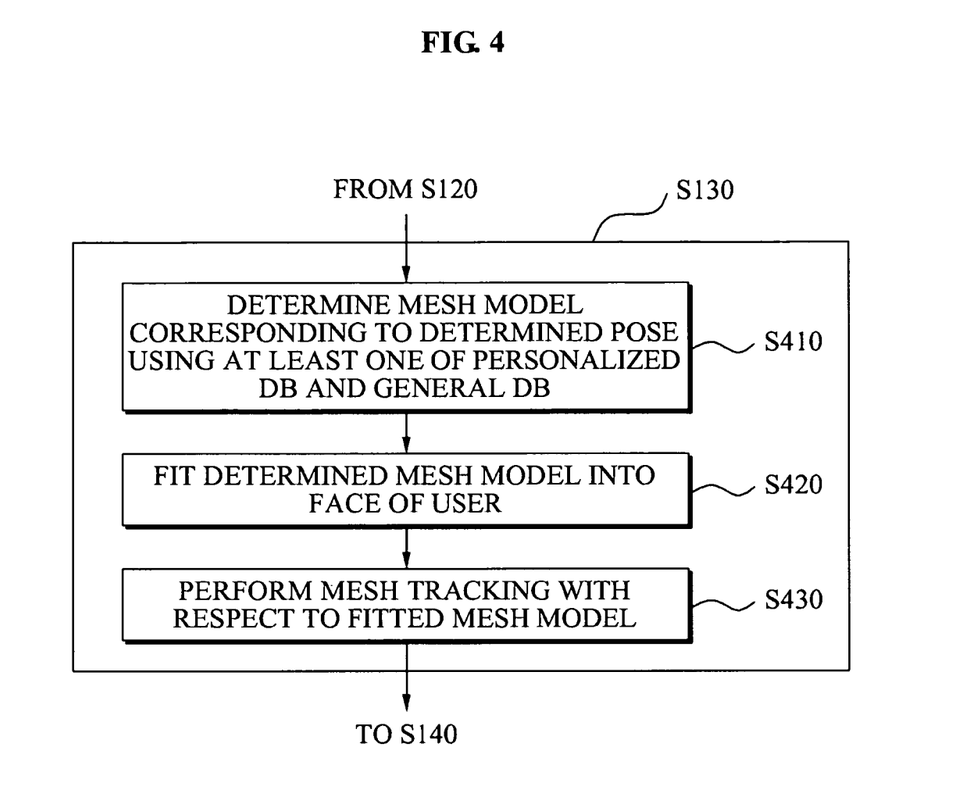
FIG. 4 is a diagram illustrating an operation for sensing facial gestures using a mesh model in the method of sensing facial gestures of FIG. 1 in detail.

FIG. 4 is a diagram illustrating a detailed configuration of an operation for sensing facial gestures using a mesh model in the method of sensing facial gestures of FIG. 1.

Referring to FIG. 4, in operation S410, the method may determine a mesh model corresponding to the determined head pose using at least one of the personalized DB and the general DB. Specifically, in the case of a user using the personalized DB as the basic DB, a mesh model parameter coinciding with characteristics of the user may be read from the personalized DB. Also, parameters used for mesh fitting may be stored in each of the DBs, and locations of feature points and filters used for finding the locations of feature points may be stored in the parameters. A method for selecting the feature points may use a Facial Action Code System (FACS), that is, a standard model for classifying emotional expressions of human being. Specifically, the feature points may be determined by an action unit for poses.

In operation S420, the method may fit the determined mesh model onto the face of the user. Specifically, the determined mesh model may store information about neutral images, and the mesh model may be fitted onto the face of the user so as to coincide with various facial gestures of the user.

In operation S430, the method may perform mesh tracking with respect to the mesh model.

Figure 5:
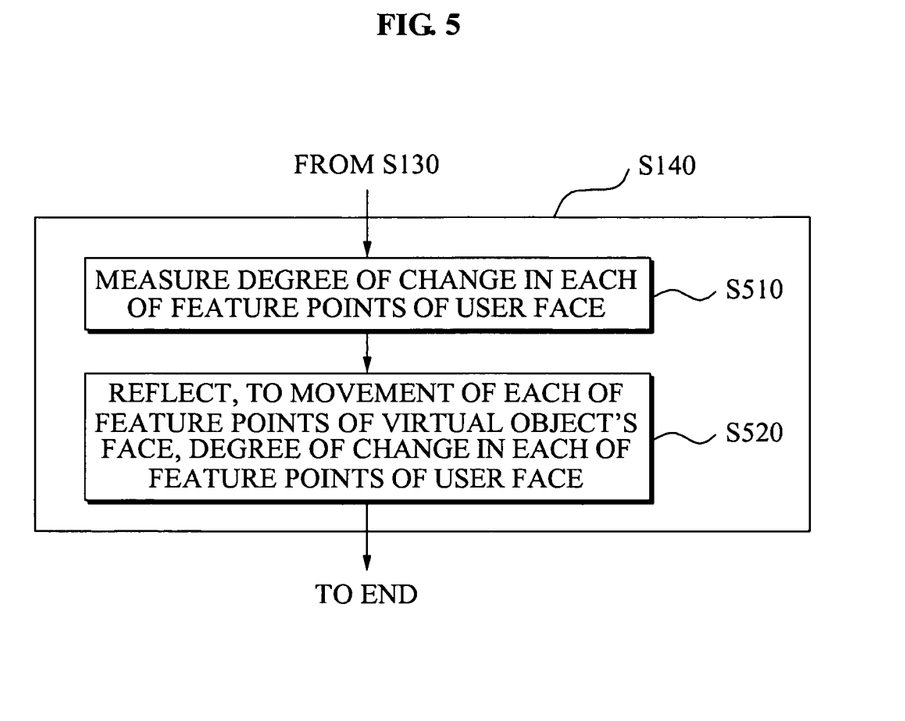
FIG. 5 is a diagram illustrating an operation for reflecting sensed facial gestures to a virtual object in the method of sensing facial gestures of FIG. 1 in detail.

FIG. 5 is a diagram illustrating a detailed configuration of an operation for reflecting sensed facial gestures to a virtual object in the method of sensing facial gestures of FIG. 1.

Referring to FIG. 5, in operation S510, the method may measure a degree of change in each of the feature points of the face of the user. Specifically, when the mesh tracking is performed, the degree of change in each of the feature points may be measured. In this instance, the degree of change may be measured, and the measured degree of change may be analyzed so as to convert facial gestures of a registered user into facial gestures of a virtual object.

In operation S520, the method may reflect the degree of change in each of the feature points of the face of the user as movement of each of the feature points of a face of the virtual object. In this instance, in order to express the facial gestures of the user on the virtual object, the personalized DB may be used. Here, as another example of a method for analyzing the facial gestures of a registered user to convert into facial gestures of an avatar, a method for recognizing an action unit of each region of a face denoted by the FACS and reflecting the recognized action unit to the avatar may be given.

As described above, information about the personalized DB including characteristics of each of the users may be reflected to, or by, the virtual object, thereby expressing detailed changes in the facial gestures of the user coinciding with the characteristics of the user. The virtual object may then be output or displayed, e.g., on a display device, while expressing the detailed changes in the facial gestures of the user.

As described above, at least one head pose may be classified, and facial gestures of input images may be recognized for each of the head poses, thereby detecting more detailed facial gestures.

Also, the personalized DB may be constructed to coincide with characteristics of the user, and facial gestures may be detected based on the personalized DB, thereby detecting more detailed facial gestures.

Figure 6:
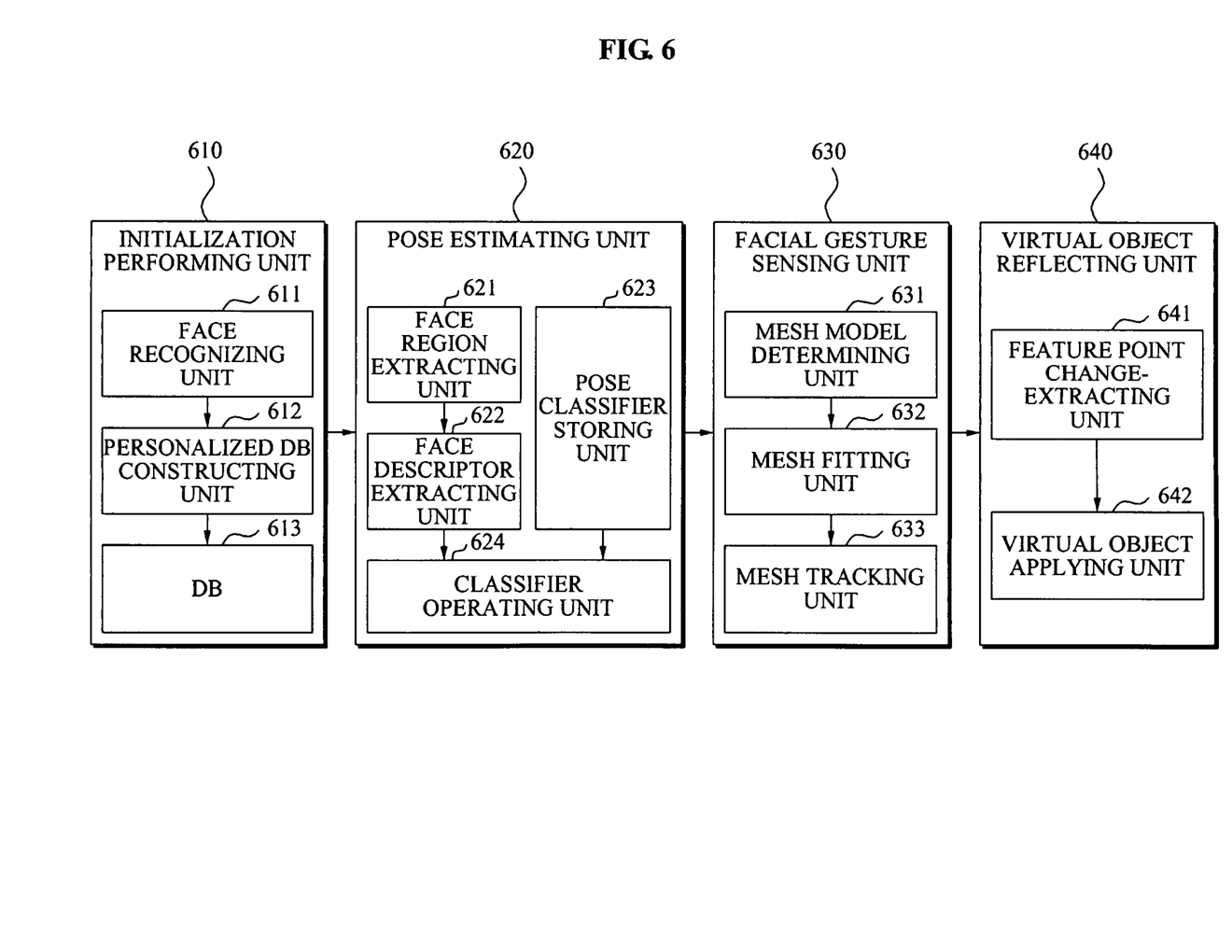
FIG. 6 is a diagram illustrating a configuration of a system of sensing facial gestures according to example embodiments.

FIG. 6 is a diagram illustrating a configuration of a system of sensing facial gestures according to example embodiments.

Referring to FIG. 6, the system of sensing facial gestures according to the present example embodiment may include an initialization performing unit 610, a pose estimating unit 620, a facial gesture sensing unit 630, and a virtual object reflecting unit 640.

The initialization performing unit 610 may determine a basic DB for sensing facial gestures of a user. Here, the initialization performing unit 610 may include a face recognizing unit 611, a personalized DB constructing unit 612, and a DB 613.

The face recognizing unit 611 may recognize a face of the user.

The personalized DB constructing unit 612 may construct the personalized DB depending on whether the user is registered, and depending on a selection of the user. Specifically, when the user is a registered user, a predetermined personalized DB may be used, and even when the user is an unregistered user, the user may select whether to construct the personalized DB. In this instance, when the user selects to construct the personalized DB, a user ID, a mesh model parameter for each of a plurality of poses, and the like may be stored to construct the personalized DB.

The DB 613 may store the personalized DB and the general DB. Specifically, the DB 613 may store both a general DB for a user who elects not to construct a personalized DB, as well as a personalized DB, which is separately constructed by a user.

The pose estimating unit 620 may estimate a head pose of the user. Here, the pose estimating unit 620 may include a face region extracting unit 621, a face descriptor extracting unit 622, a pose classifier storing unit 623, and a classifier operating unit 624.

The face region extracting unit 621 may extract a face region of the user.

The face descriptor extracting unit 622 may extract a face descriptor from the face region. Here, the face descriptor may include a vector including information about characteristics of the face region.

The pose classifier storing unit 623 may store a pose classifier for classifying a plurality of poses. Here, the pose classifier storing unit 623 may store a quantity of pose classifiers that is identical to the number of poses intended to be classified.

The classifier operating unit 624 may perform a projection operation on the face descriptor with the pose classifier. Specifically, the head pose may be estimated depending on results of the projection operation.

The facial gesture sensing unit 630 may extract a mesh model corresponding to the estimated head pose using at least one of the personalized DB and the general DB, and sense the facial gestures using the extracted mesh model.

Here, the facial gesture sensing unit 630 may include a mesh model determining unit 631, a mesh fitting unit 632, and a mesh tracking unit 633.

The mesh model determining unit 631 may determine a mesh model corresponding to the estimated head pose using at least one of the personalized DB and the general DB.

The mesh fitting unit 632 may fit the determined mesh model onto a face of the user.

The mesh tracking unit 633 may perform mesh tracking with respect to the fitted mesh model.

The virtual object reflecting unit 640 may reflect the sensed facial gestures to the virtual object. Here, the virtual object reflecting unit 640 may include a feature point change-extracting unit 641 and a virtual object applying unit 642.

The feature point change-extracting unit 641 may measure a degree of change in each of the feature points of the face of the user.

The virtual object applying unit 642 may apply the degree of change to movement of each of feature points of a face of the virtual object. In this instance, the degree of change in each of the feature points may be reflected to the virtual object to coincide with characteristics of the user using the personalized DB and general DB.

As described above, the method of sensing facial gestures using the personalized DB may classify at least one pose with respect to input images of the user, construct a user DB for each of the classified poses, and perform mesh fitting coinciding with characteristics of the user.

Also, the method may classify at least one pose with respect to the input images of the user, and may sense facial gestures for each of the classified poses, so that the facial gestures may be stably sensed even during rapid changes of the poses, and the DB individualized with respect to each of the users may be constructed and the sensed facial gestures may be utilized, thereby precisely detecting the facial gestures coinciding with characteristics of each of the users.

The method of sensing facial gestures according to the above-described example embodiments may be recorded in computer-readable media including program instructions to implement various operations embodied by a computer. The media may also include, alone or in combination with the program instructions, data files, data structures, and the like. Examples of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa. The software modules may be executed on any processor, general purpose computer, or special purpose computer including a facial gestures sensing system or apparatus.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A facial gesture sensing method, comprising:
   recognizing, by one or more processors, a face of a person from an input image;
   determining, by the one or more processors, that the person is unregistered based on the recognizing of the face of the person;
   in response to the determining that the person is unregistered, determining, by the one or more processors, a first facial sensing database (DB), wherein the determining of the first facial sensing DB comprises enabling the person to select between constructing a personalized DB comprising characteristics of the person as the first facial sensing DB and setting an existing DB, in which the person is unregistered, as the first facial sensing DB;
   estimating, by the one or more processors, a head pose of the person;
   extracting, by the one or more processors, a mesh model corresponding to the estimated head pose by accessing the first facial sensing DB;
   sensing, by the one or more processors, facial gestures of the person by applying the extracted mesh model; and
   reflecting, by the one or more processors, the facial gestures of the person to a virtual object, based on the sensing of the facial gestures of the person.

* * * * *